US006318409B1

(12) United States Patent
Bonnefous et al.

(10) Patent No.: US 6,318,409 B1
(45) Date of Patent: Nov. 20, 2001

(54) SYSTEM FOR ASSEMBLING AT LEAST TWO PRESSURIZED FLUID CONTROL MEMBERS

(75) Inventors: Jean Bonnefous, Reze; Bruno Maraud, Basse Goulaine; Benoît Sagot, Gorges, all of (FR)

(73) Assignee: S.A. Defontaine, La Bruffiere (FR)

( * ) Notice: Subject to any disclaimer, the term of this patent is extended or adjusted under 35 U.S.C. 154(b) by 0 days.

(21) Appl. No.: 09/605,383

(22) Filed: Jun. 28, 2000

(30) Foreign Application Priority Data

Jun. 28, 1999 (FR) .................................................. 99 08246

(51) Int. Cl.[7] ...................................................... F16K 11/10
(52) U.S. Cl. ............................................ 137/884; 137/269
(58) Field of Search ...................................... 137/884, 269

(56) References Cited

U.S. PATENT DOCUMENTS

| | | | |
|---|---|---|---|
| 3,384,114 * | 5/1968 | Hathaway et al. | 137/884 |
| 3,806,088 | 4/1974 | Stoneman et al. . | |
| 4,225,089 | 9/1980 | Stone . | |
| 5,642,756 | 7/1997 | Lawerence et al. . | |
| 5,906,223 * | 5/1999 | Pinkham | 137/597 |

FOREIGN PATENT DOCUMENTS

| | | |
|---|---|---|
| 2432835 A1 | 1/1976 | (DE) . |
| 142281 A1 | 5/1985 | (EP) . |
| 816731 A2 | 1/1998 | (EP) . |
| 824196 A1 | 2/1998 | (EP) . |

* cited by examiner

*Primary Examiner*—John Fox
(74) *Attorney, Agent, or Firm*—Sughrue, Mion, Zinn, Macpeak & Seas, PLLC

(57) ABSTRACT

A system for assembling at least two pressurized fluid control members is made up of an interface to which the control members, which are essentially pneumatic, are fixed. The interface includes fluid pipes connecting their feed and outlet orifices and at least two faces with an angle α between them from 5° to 175° and each of which receives at least one of the control members.

9 Claims, 5 Drawing Sheets

SYSTEM FOR ASSEMBLING AT LEAST TWO PRESSURIZED FLUID CONTROL MEMBERS

BACKGROUND OF THE INVENTION

1. Field of the Invention

The present invention relates to a system for assembling at least two pressurized fluid control members which takes the form of an interface to which said control members, which are essentially pneumatic, are fixed.

The technical field of the invention is the production of control units for actuators for valves used in the agriculture-foodstuffs and sanitation industries.

2. Description of the Prior Art

A control unit of the above kind has various components such as electrical terminal blocks, detectors, control, command and regulation electronic modules and all kinds of pressurized fluid control members, such as solenoid valves or electrically-operated distributor valves, which, by allowing a control fluid, preferably compressed air, to pass or not, selectively actuate the opening and/or the closing of a valve. These control units are generally mounted directly on the top of the valve, on the one hand to simplify the assembly of the valve and to reduce the length of the control pipes and on the other hand to enable monitoring by means of any cam and sensor device of the position of the mobile members of the valve, a part of which, such as the end of the actuator rod, can therefore project into the control unit.

In the case of units currently known in the art which have to house at least two control members, such as solenoid valves, external to the block proper on which they are fixed, either their size (height or diameter) is increased, which is a problem because it increases the overall size of the valve, or the size of the solenoid valves is reduced, which is to the detriment of their control fluid flow cross section, which compromises the valve closing or opening speed.

The units are generally cylindrical, so as to be continuous with the body of the valve, and the space available inside them is limited by the many members to be housed in them: also, at present, when it is required to use at least two control members, such as two solenoid valves, mounted on a common interface unit enabling flow of the control fluid, it is impossible, without increasing the size of the control unit or reducing that of the solenoid valves, to place the valves there along with their interface unit, because the resulting assembly is of generally parallelepiped shape and occupies a relatively large volume.

The problem that arises is that of being able to produce valve actuator control units of the above kind, intended in particular for the agriculture-foodstuffs and sanitation industries, in which at least two if not three or more control members, such as solenoid valves, electrically-operated distributor valves or any pressurized fluid logic elements (such as essentially pneumatic elements, referred to in the present description by the generic term “control members” or the more specific term “solenoid valves”) are housed therein, within a compact overall size and within a volume whose external shape is curved, such as a circular cylinder, without compromising the performance of the valve actuators in terms of the control fluid flowrate.

One solution to the problem stated is a system for assembling at least two pressurized fluid control members, where said fluid is preferably gas and even compressed air, which takes the form of an interface to which said control members are fixed and including fluid flow pipes. The pipes connect in particular at least the feed and outlet orifices of the control members which actuate opening and closing of at least one valve of a foodstuffs product conveyor circuit.

SUMMARY OF THE INVENTION

According to the invention, the interface unit has at least two faces with an angle $\alpha$ between them from 30° to 60°, which angle is approximately 45° in one particular embodiment, and each of which is adapted to receive at least one of the control members; at least one of the faces of the interface unit is even adapted to receive at least two control members. In fact these faces are situated in radial planes perpendicular to tangents to the curve of the outside shape of the control unit in which the interface unit is to be housed: if that curve is a circle, and the control unit is therefore a circular cylinder, these faces are in diametral planes. The other faces which join them of course follow this outside shape on one side, of which they therefore constitute chords, and that of the central part on the other side, so that the interface unit appears to be generally triangular when seen in a plane perpendicular to those faces.

The result is a new system for assembling at least two control members on an interface unit which solves the problem stated: by fixing at least two control members to two separate faces of the interface unit, the angle between which in fact corresponds to the curvature of the outside shape of the control unit in which they are to be housed, the control members can be placed as close as possible to that outside shape and therefore occupy the smallest possible overall volume; this frees up the rest of the volume inside the control unit for its other components, without having to increase the size of the control unit or to reduce the size of the control members, for example in order to ensure for the solenoid valves an optimum compressed air flowrate such as $3.66\times10^{-3}$ $Nm^3/s$.

Thus with three control members such as solenoid valves assembled in accordance with the invention and ensuring at least the above flowrate the dimensions of the control unit can be limited to a diameter and a height of 130 mm, compared to existing control units including at least three solenoid valves with the same flowrate, which have heights of the order of 230 mm and a diameter of 180 mm, which additionally increases their price. To remain within dimensions of 130 mm, both for the height and for the diameter, some manufacturers use solenoid valves with a lower flowrate such as $1.5\times10^{-3}$ $Nm^3/s$ or $1.66\times10^{-3}$ $Nm^3/s$, which degrades the performance of the valves and is incompatible with the speed requirements of modern fabrication processes in the agriculture-foodstuffs and sanitation industries.

Other advantages of the present invention could be cited, but those cited above are already sufficient to demonstrate the novelty and the benefit of the invention. The description and the accompanying drawings refer to one embodiment of the invention in the form of a system for three solenoid valves, although this is not limiting on the invention. Other embodiments are possible within the scope and the extent of the invention, in particular by changing the shapes of the faces that do not carry control members, by replacing the solenoid valves shown with one or more other control members, or by increasing the number of control members, for example with two control members on each face, or reducing the number of control members, with one only on each face.

DETAILED DESCRIPTION OF THE PREFERRED EMBODIMENT

Figure 1:
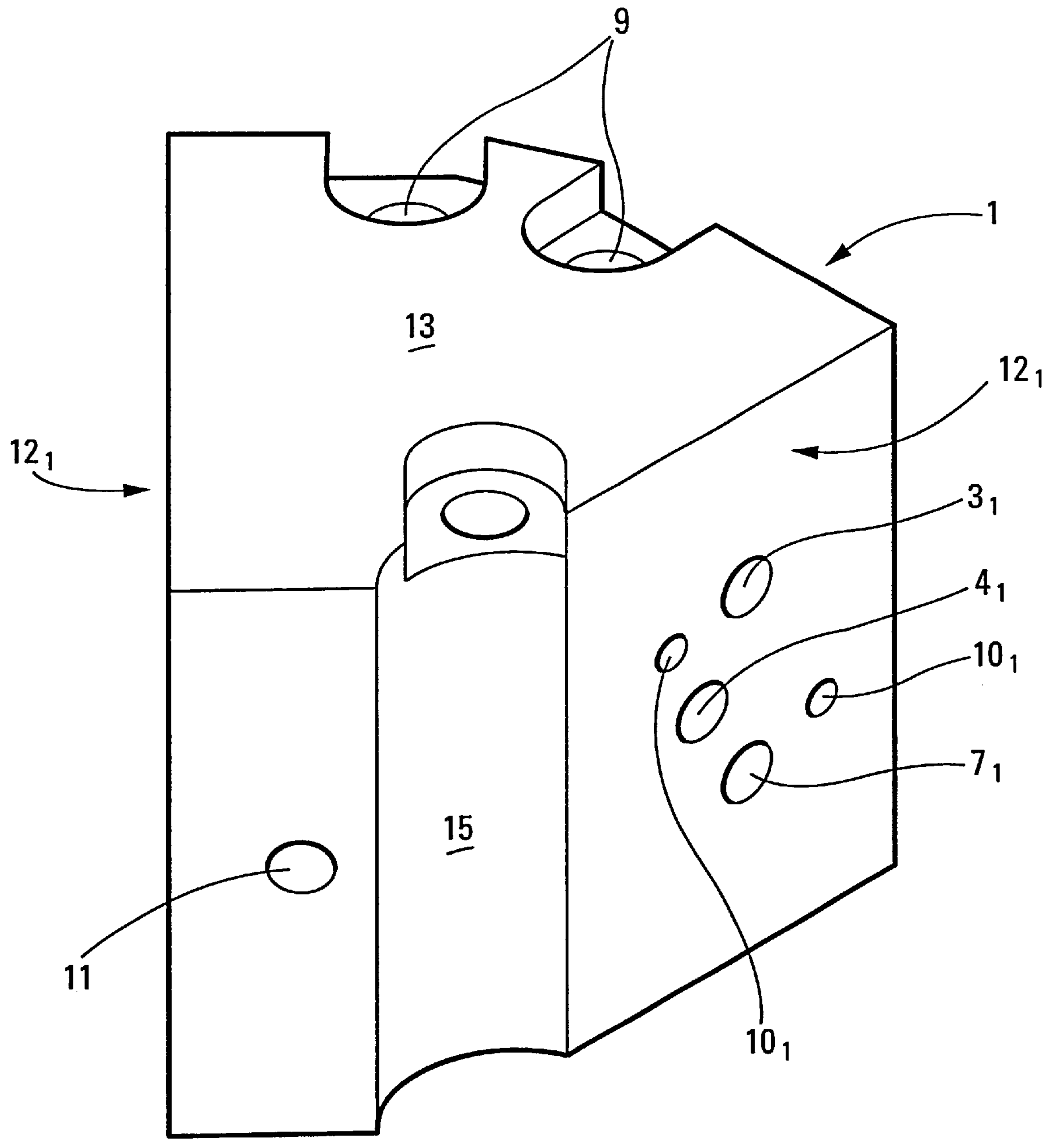
FIG. 1 is a perspective view of an interface unit for use in an assembly system according to the invention.
Figure 2:
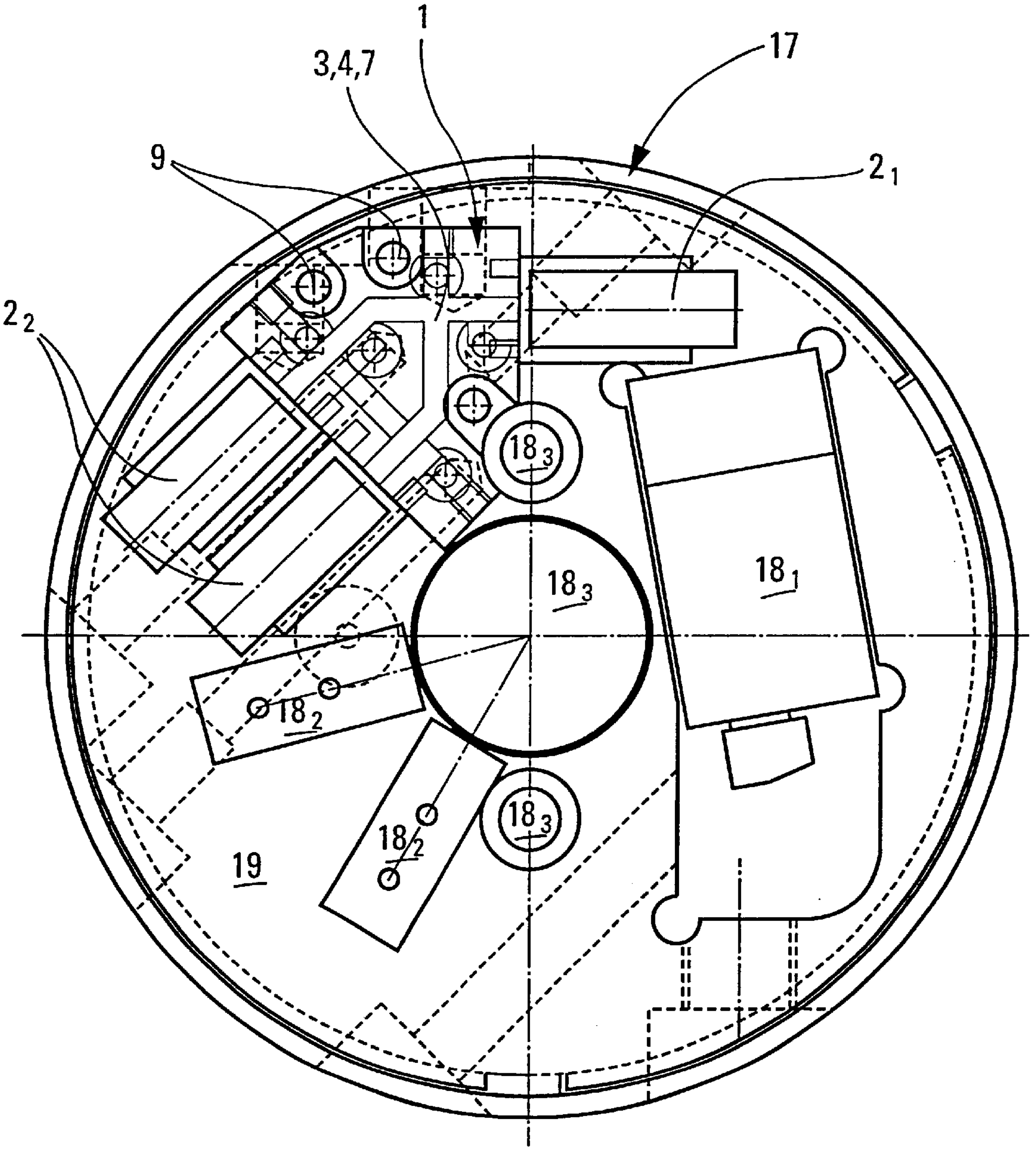
FIG. 2 is a top view of a control unit including various members for controlling actuators operating a valve, including in particular the assembly system according to the invention.
Figure 7:
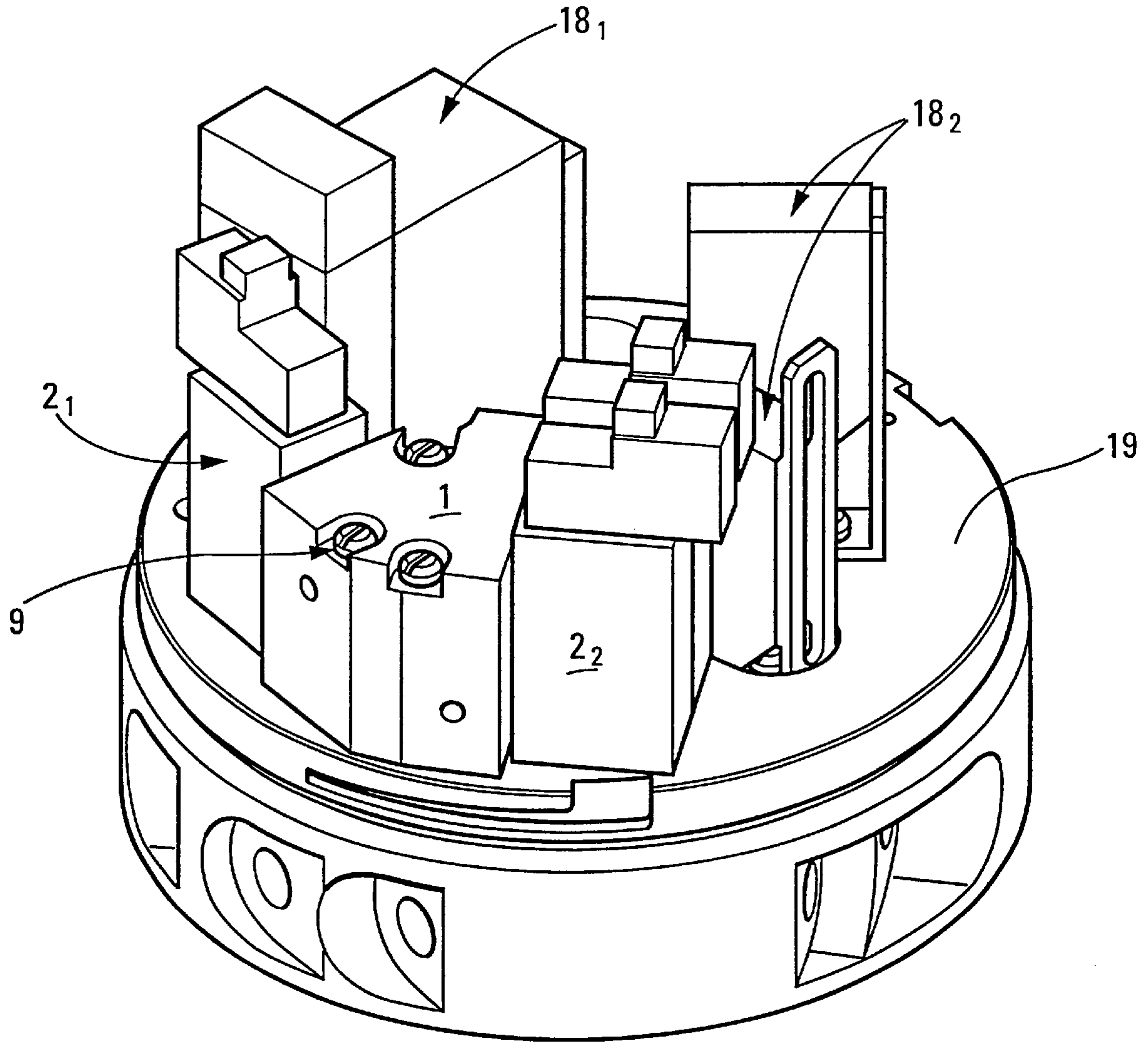
FIG. 7 is a perspective view of a unit according to FIG. 2 without the cover.

The invention is particularly suited to standard forms of the control unit 17 which have:

- a flat and usually circular base 19 including means for direct fixing to the top of the actuator which operates the valve the pneumatic connections to the solenoid valves 2 and the gland or connector associated with the connections of the electrical or electronic functions integrated into the valve, to which means the component parts of the unit 17 are fixed, and
- a usually cylindrical closure cover fixed firmly to and sealed to the base 19 to protect the component parts of the control unit 17, which is shown from above in FIG. 2 and in perspective in FIG. 7 without its cover.

By the virtue of the present invention, the outside shape of this control unit, which is a cylinder in this instance, can have exactly the same diameter as the head of the body of the actuator operating the valve. The interior volume determined by this exterior shape can receive the various component parts 2, 18 of the control unit without it being necessary to stack them in the heightwise direction, such parts including:

- not only said control members 2 such as solenoid valves or electrically-operated distributor valves, or logic cells (including any emergency-off or other kind of switch, essentially pneumatic position sensors, etc.), with their interface block 1,
- but also electrical terminal blocks of the electronic components such as sensors, control, command and regulation modules, and electrical wiring, without impeding the exit orifices for the rod $\mathbf{18_3}$.

The assembly system according to the invention shown in the accompanying drawings for three solenoid valves 2 is made up of an interface unit 1 to which the solenoid valves are fixed and which includes fluid (preferably compressed air) pipes 3, 4, 7 connecting the feed and outlet orifices thereof to command the opening and closing of the valve mounted on a foodstuffs product conveyor pipe circuit.

Figure 3:
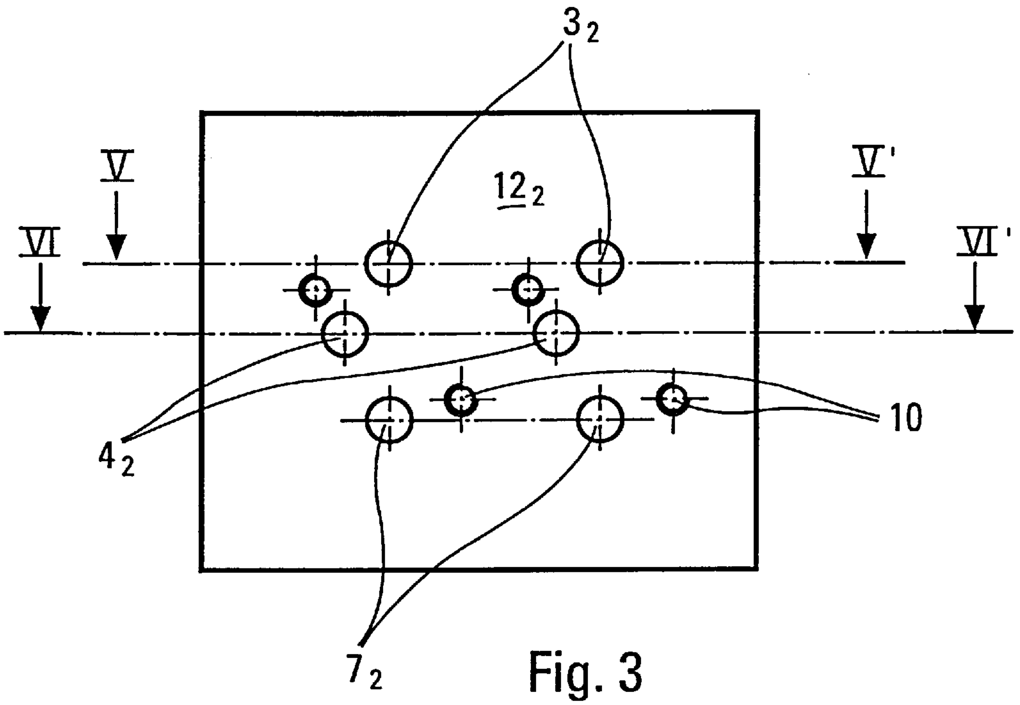
FIG. 3 is a lateral and external view of one face of the interface unit from FIG. 1 adapted to receive two solenoid valves.
Figure 4:
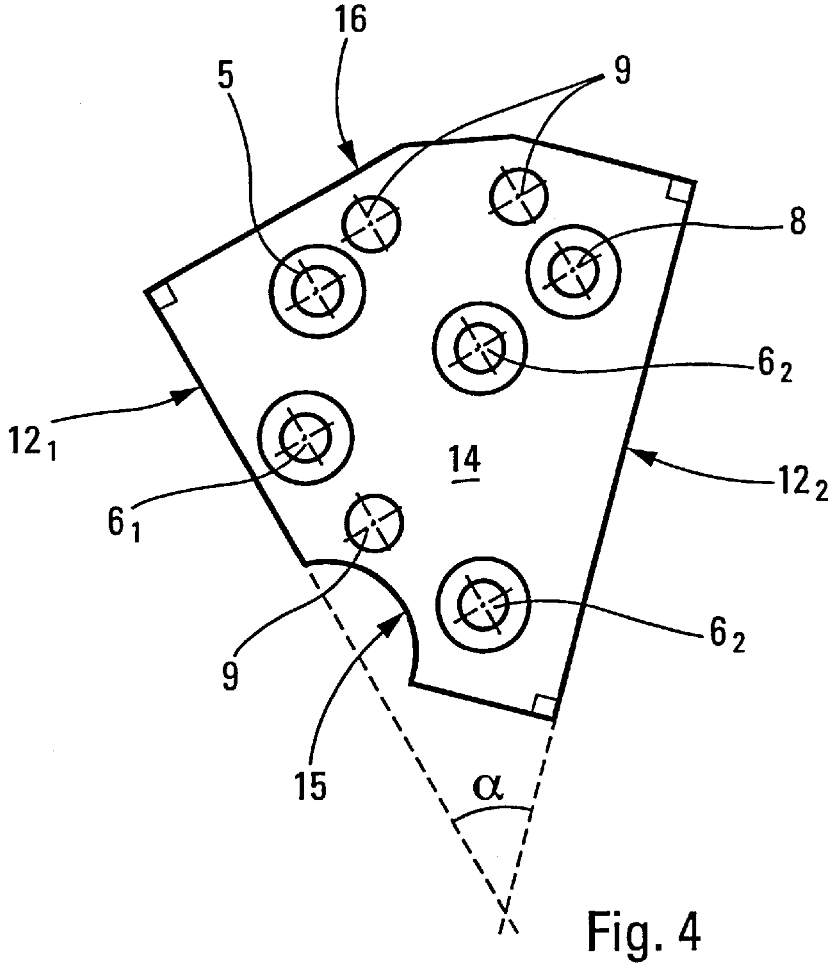
FIG. 4 is a bottom view of the interface unit shown in FIGS. 1 and 3.

In FIG. 3, one of the faces $\mathbf{12_2}$ of the interface unit 1 is adapted to receive two solenoid valves 2 and the other face $\mathbf{12_1}$ receives only one valve and incorporates a notch 15 through which a mobile rod $\mathbf{18_3}$ passes.

The interface unit 1 has three bores 9 which run between its top face 13 and its bottom face 14 so that it can be fixed to the base 19 of the control unit 17.

The two separate faces 12 receiving the solenoid valves 2 are plane with a predetermined angle $\alpha$ between them such that the distal ends of the solenoid valves 2 fixed to the interface unit 1 are inscribed within the curved shape of the unit 17 and its base 19. The angle $\alpha$ can therefore be from 5° to 175°, according to the respective size of the electrodes 2 of the interface unit 1 and the control unit 17, i.e. preferably from 30° to 60°, approximately 45° in the accompanying embodiment, the control members or solenoid valves 2 being disposed head-to-tail on respective opposite sides of the interface unit 1.

The shape of the surface 16 which joins the diverging edge of the faces 12 supporting the control members 2 can be any shape, such as a plane or curved or faceted shape, to match as well as possible the shape of the control unit 17 without preventing the drilling of the pipes 3, 4, 7 and the fixing holes 9.

The top face 13 and the bottom face 14 of the interface 1 are parallel to each other and perpendicular to the fixing faces 12 of the control members 2; said faces 12 can join at the angle $\alpha$ along an edge perpendicular to the top and bottom faces or be joined by another face 20 which is preferably perpendicular to one of the faces 12. The control members 2 are also fixed perpendicularly to the faces 12 and to the top and bottom faces 13, 14 by means of bores $\mathbf{10_1}$ and $\mathbf{10_2}$ on the convergent/divergent faces 12.

Figure 5:
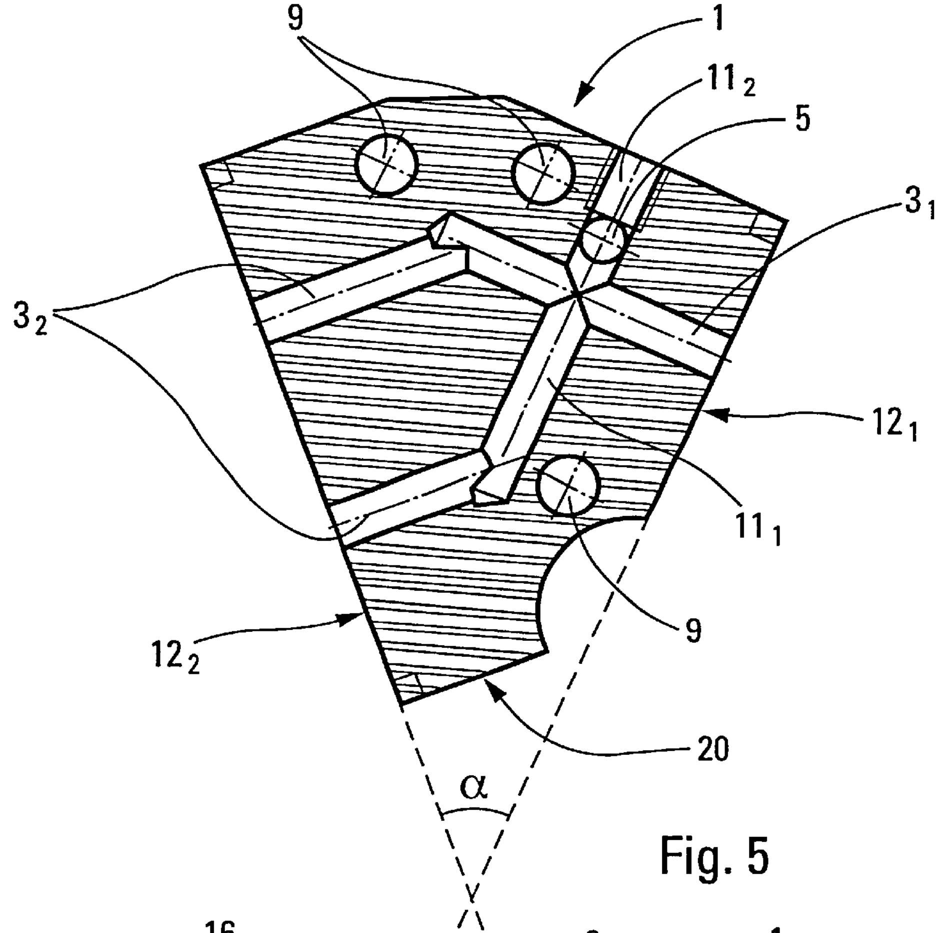
FIG. 5 is a view in section taken along the line V–V' of the interface unit shown in FIG. 3.
Figure 6:
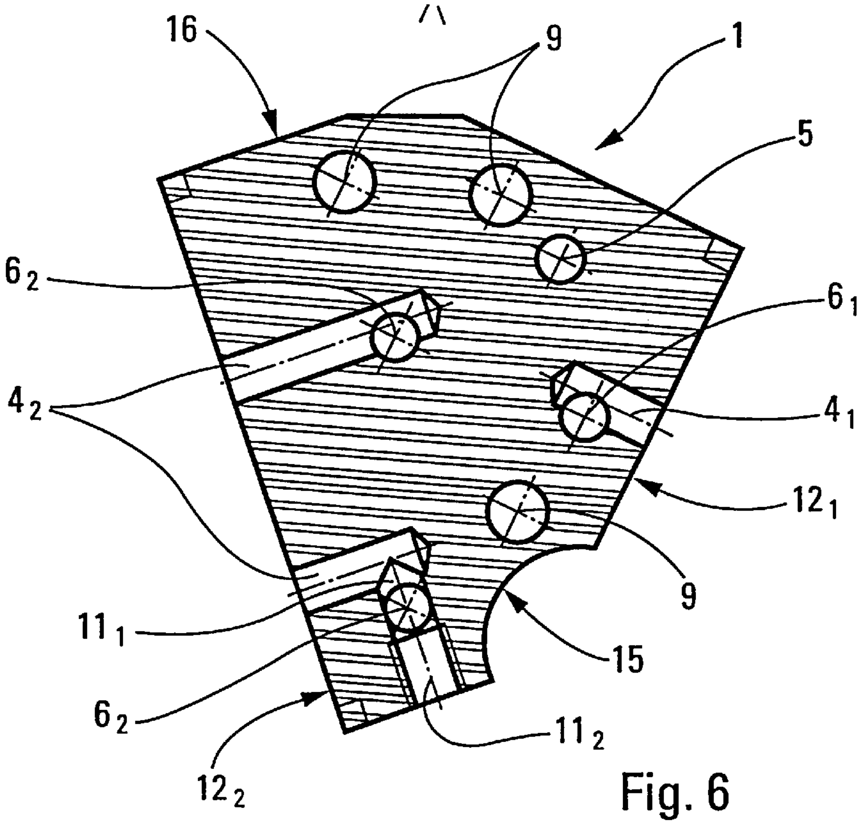
FIG. 6 is a view of the same interface unit in section taken along the line VI–VI' in FIG. 3.

With reference to the fluid (e.g. compressed air) pipes 3, 4, 7 in the interface unit 1, their flow sections are able to assure an air flowrate of at least $3.33\times10^{-3}$ $Nm^3/s$ for each solenoid valve 2 with a working pressure of 6 bars at a temperature from −40° C. to 130° C. and in an environment with a high relative humidity:

- a single fluid exhaust pipe network 3 connects the outlet orifices of the control members such as the solenoid valves to a single exhaust orifice 5 on the lower base 14 of the interface 1, as shown in FIG. 5;
- a single feed pipe network 7 connects all the compressed air feed orifices of the control members such as solenoid valves 2 to a single feed orifice 8 which is also on the lower face 14 of the interface unit 1;
- in contrast, each control member such as a solenoid valve 12 is associated with a pipe circuit 4 specific to each control member and which discharges to a corresponding orifice 6 also on the lower face 4 of the interface unit 1 (see FIG. 6).

The pneumatic seals at the orifices of the fluid pipe 3, 4, 7, which are essential for safety, are assured by seals dedicated to the associated function for each orifice:

- on the side of the control members 2, such as solenoid valves, on the faces $\mathbf{12_1}$ and $\mathbf{12_2}$ which receive them, the seals are provided by dedicated gaskets of each control member such as a solenoid valve 2;
- on the base 19 of the control unit 17, the seals are provided by a series of O-rings accommodated in spot facings provided for this purpose around the orifices 5, $\mathbf{6_1}$, $\mathbf{6_2}$ and 8 of the interface unit 1 or by a dedicated border gasket.

All the orifices of the fluid (e.g. compressed gas or air) pipes 3, 4, 7 connecting the feed and exhaust orifices of the control member 2 are therefore on the lower face 14 of the interface unit 1, although they could be on one or more lateral faces.

The pneumatic interface unit can instead be fully integrated into the base 19 of the control unit and consist of a cast one-piece assembly, for example.

The fluid pipes in the interface unit 1 are drilled from the respective face of the unit; thus those adjacent the faces 12 receiving the control members, such as the solenoid valves 2, are preferably perpendicular to the latter to enable the bores $11_1$ connecting certain interface conduits to be drilled, their external orifices $11_2$ being blocked afterward (see FIGS. 5 and 6).

The interface unit 1 can be made of any metallic materials, in particular aluminum, or plastics materials, and by any method of manufacture known in the art.

Another advantage of the present invention is that the assembly system can be adapted to any type of control member, such as solenoid valves, and that the control unit 17 which contains them can be fitted to any existing valve, all that has to be done is to change the control unit without modifying the valve.

Of course, the invention is not limited to the example just described and many modifications can be made to that example without departing from the scope of the invention.

There is claimed:

1. A system for assembling at least two pressurized fluid control members comprising; an interface unit to which said control members are fixed and including fluid pipes connecting at least feed and outlet orifices of said control members, wherein said interface has two faces without another face between them forming an angle α between them in the range of 30° to 60° and, each of said faces is adapted to receive at least one of said control members.

2. The system claimed in claim 1 wherein said control members are solenoid valves which control the opening and closing of at least one valve in a foodstuffs product conveyor circuit.

3. The system claimed in claim 1 wherein at least one of said faces of said interface unit is adapted to receive at least two control members.

4. The system claimed in claim 1 wherein said angle α is of the order of 45°.

5. The system claimed in claim 1 wherein said fluid flowing in said interface unit and feeding said control members is compressed air.

6. The system claimed in claim 5 wherein the flow sections of said fluid pipes in said interface unit are adapted to assure an air flowrate of at least $3.33\times10^{-3}$ $Nm^3/s$ for each control member.

7. The system claimed in claim 1 wherein said interface unit includes a single pipe network for feeding said control members and another single pipe network for exhausting said fluid.

8. The system claimed in claim 1 wherein all orifices of said fluid pipes connecting said feed and outlet orifices of said control members are on the bottom face of said interface unit which is perpendicular to said faces receiving said control members.

9. The system claimed in claim 1 wherein all orifices of said fluid pipes include seals dedicated to the function assured by each of said orifices.

* * * * *